June 24, 1969     B. P. GURULE     3,451,881

GEODESIC STRUCTURE

Filed Dec. 20, 1965

INVENTOR.
BENJAMIN P. GURULE
BY Huebner & Worrel
ATTORNEYS.

INVENTOR.
BENJAMIN P. GURULE
BY
Huebner & Worrel
ATTORNEYS.

June 24, 1969   B. P. GURULE   3,451,881
GEODESIC STRUCTURE

Filed Dec. 20, 1965   Sheet 3 of 5

INVENTOR.
BENJAMIN P. GURULE
BY Huebner & Worrel
ATTORNEYS.

June 24, 1969  B. P. GURULE  3,451,881
GEODESIC STRUCTURE

Filed Dec. 20, 1965  Sheet 4 of 5

INVENTOR.
BENJAMIN P. GURULE
BY Huebner & Worrel
ATTORNEYS.

INVENTOR.
BENJAMIN P. GURULE
BY Huebner & Worrel
ATTORNEYS.

United States Patent Office 3,451,881
Patented June 24, 1969

3,451,881
GEODESIC STRUCTURE
Benjamin P. Gurule, 356 W. Ave. 43,
Los Angeles, Calif. 90065
Filed Dec. 20, 1965, Ser. No. 515,114
Int. Cl. D04d 7/04
U.S. Cl. 161—7                          10 Claims

ABSTRACT OF THE DISCLOSURE

A self-supporting geodesic structure composed of three or more similar elongated bands each being made up of a series of connected structural elements one less in number than the number of bands. The geodesic bands are interengaged with each of the structural elements of each band overlying or underlying an element of another band so as to define a space container with alternating elements of bands under tension and compression to provide support energy for the structure.

---

The present invention relates to space-enclosing structures, and it relates particularly to a novel structural system having a basis of three or more geodesic bands which are similar in configuration and are interengaged in a self-supporting arrangement.

A primary objective of the present invention is to provide a structural system wherein three-dimensional space-enclosing bodies having strong, rigid structural characteristics may be constructed from relatively thin and lightweight materials, preferably sheet materials such as paper, cardboard, sheet plastics and sheet metals.

Another object of the present invention is to provide a novel structural system of the character described wherein the same generic or basic system can be employed in a wide variety of different species and variations to suit various structural and artistic characteristics for a large number of end uses. Thus, by proper choice of the number, form and composition of the geodesic bands, the present invention is well adapted for the production of such structures as lamp shades having a wide variety of structural and ornamental configurations, decorative displays, packages, collapsible furniture, collapsible camping equipment, water fountains and building structures. Other end uses will be suggested from the following description of the invention and the accompanying drawings.

Structures made in accordance with the present invention comprise any desired number of substantially identical geodesic bands, down to a minimum of three geodesic bands in the simplest form of the invention. The bands are termed "geodesic" because structures according to the present invention tend to approach a generally spherical form as the number of bands increases, and the bands themselves are generally disposed as intersecting great circles of the sphere. However, the bands are each composed of an elongated series of segments, and when only a few bands are employed in a structure according to the invention these segments of the bands may have relatively abrupt directional changes so that the segments are generally disposed as chords of great circles. Accordingly, the term "geodesic" is employed in the present application to indicate that the bands which are interengaged to provide the structures of the present invention are each generally positioned as a great circle or chords thereof. In some forms of the invention the structure will be flattened or otherwise distorted from the generally spherical shape, but nevertheless the bands are interrelated in the same manner and will accordingly be referred to herein as "geodesic" bands.

While the present invention will be best understood from the detailed description of a number of specific forms of the invention illustrated in the drawings, a brief description of some of the specific features of the invention at this time will provide a better understanding of the common characteristics of the various specific forms of the invention shown in the drawings.

One of the important features of the invention is that all of the bands which are interengaged to form a particular structure are of substantially identical configuration. This makes structures according to the invention particularly well adapted to mass production, and it is an important factor in providing structural accuracy, strength and beauty.

Each of these similar bands is segmented into a plurality of "elements," and each of the elements has two parts, a "bridge" and a "sling." In all forms of the present invention the number of elements in each band will be one less than the number of bands. Thus, in the simplest or minimum structure according to the present invention which has three geodesic bands, each band will have two elements; if the structure has four bands, each band will have three elements; with five bands, each has four elements; with six bands, each band has five elements; and this same relationship holds true up to any desired number of bands.

When the separate bands are joined together to form a structure according to the invention, each bridge of a band will overlie a sling of another band, so that all of the bridges of the various bands will constitute outer structural members or surfaces of the structure and all of the slings of the various bands will constitute inner structural members of the device. This overlapping of each sling by a bridge results in a double-walled structure, and in structures where the bands are of suitable width and configuration to fully enclosed the space within the structure, substantially the entire structure will be double-walled. The double wall is an important factor in good structural strength, and provides a great deal of design latitude, in that design configurations and surface ornamentations may be applied to both the inner and outer walls.

A further common characteristic of various structural forms made in accordance with the present invention is that the geodesic bands are preferably composed of a material having a certain amount of resiliency, and when the bands are bent into their geodesic configurations and are interengaged to form the structure, this resiliency will result in substantial compression forces in the bridges and tension forces in the slings, resulting in considerable support energy in the over-all structure which provides rigidity thereto. This support energy is greatly enhanced by structural rigidity that is also embodied in the system by the bending, creasing and partial folding of sheet material employed in the bands, as will be apparent from the following description of specific forms of the invention which are illustrated in the drawings.

Further objects and advantages of the present invention will appear during the course of the following part of this specification, wherein the details of constructions and mode of operation of certain illustrative embodiments are described with reference to the accompanying drawings, in which.

Figure 4:
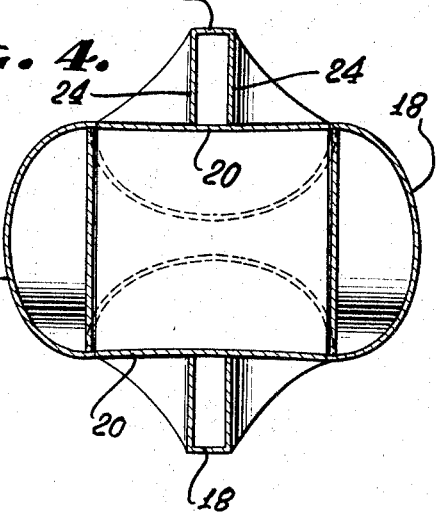
FIGURE 4 is a horizontal section taken on the line 4—4 in FIGURE 3.
Figure 5:
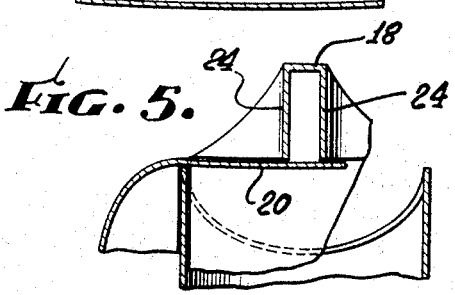
FIGURE 5 is a fragmentary vertical section, with a portion broken away, taken on the line 5—5 in FIGURE 3.
Figure 6:
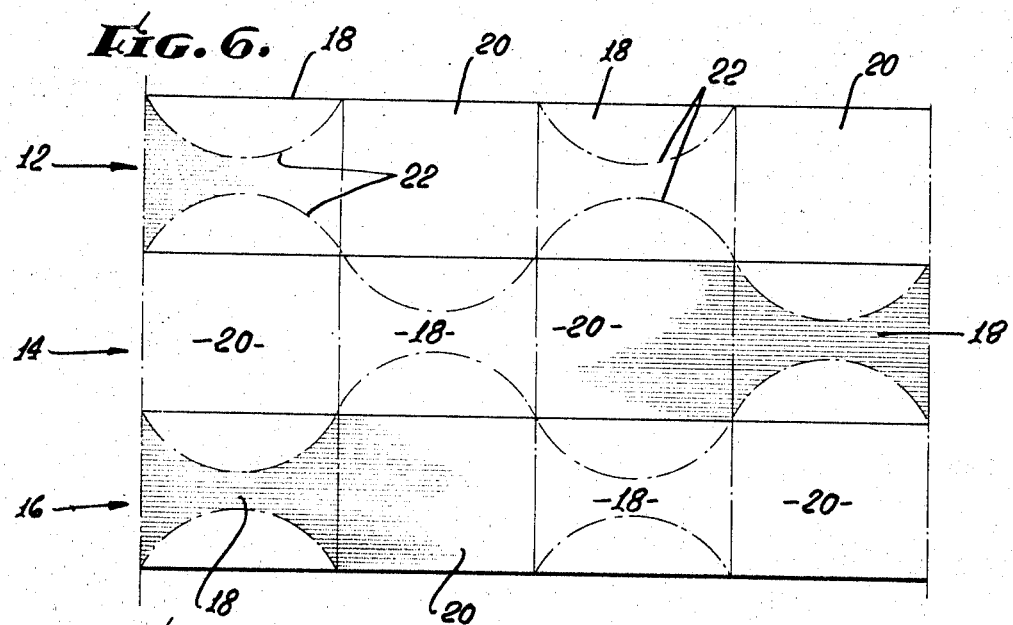
FIGURE 6 is a plan view illustrating the three bands employed in the structure of FIGURES 1 to 5.

Referring to the drawings, and at first particularly to FIGURES 1 to 6 thereof, these figures illustrate one form of a three-band structure 10 made in accordance with the present invention. The structure 10 comprises three identical bands 12, 14 and 16 which are illustrated in plan view in FIGURE 6, and are relatively wide, straight, elongated strips of sheet material such as paper, cardboard, sheet plastic or the like. As is apparent from FIGURE 6, the bands 12, 14 and 16 can be cut from a single rectangular sheet. In FIGURE 6 the bridges and slings have been separated by phantom lines, and each of the bands comprises an alternating series of bridges 18 and slings 20. It will be seen that each band has two of the bridges 18 and two of the slings 20. An adjacent bridge-sling combination is referred to herein as an element, and it will be apparent that each of the bands 12, 14 and 16 has two such elements.

In the form of the invention shown in FIGURES 1 to 6 each of the bridges is provided with an opposed pair of arcuate scores 22 which provide regions of controlled failure in the bridges permitting the sides of the bridges to be pinched together so that the bridges will become strong, rigid, compressional members.

Figure 1:
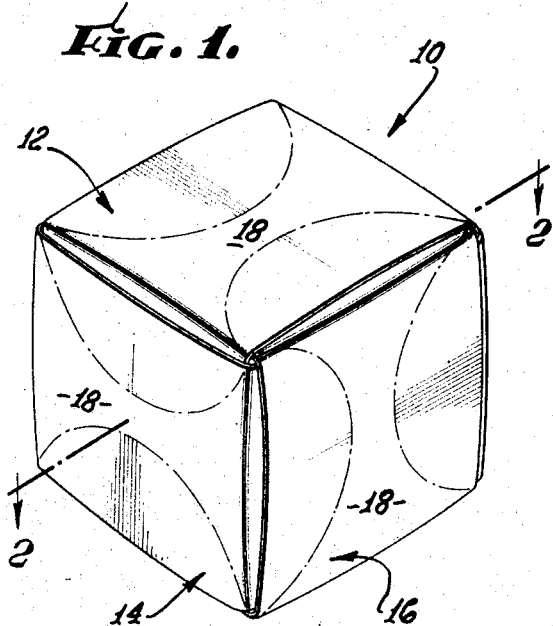
FIGURE 1 is a perspective view illustrating a simple form of the present invention which embodies three bands, the bands being loosely assembled in FIGURE 1.
Figure 3:
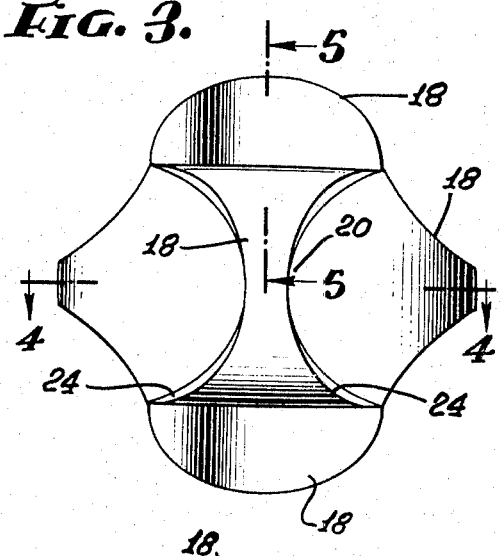
FIGURE 3 is an elevational view of the three-band geodesic structure of FIGURES 1 and 2, with the sides of the exposed bridges pinched inwardly from curved score lines seen on the bridges in FIGURE 1, so that the bridges stand out as generally rigid structures.
Figure 2:
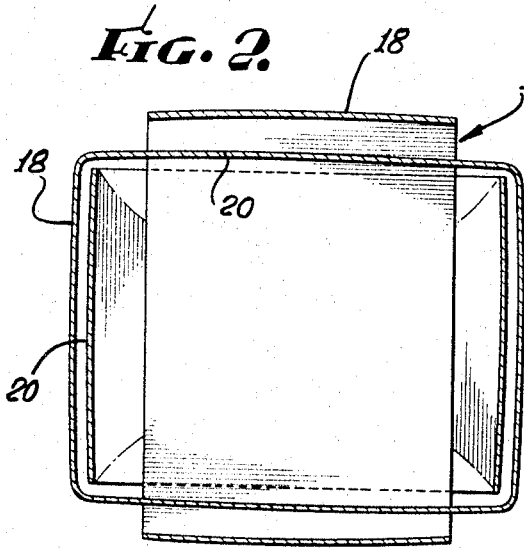
FIGURE 2 is a vertical section taken on the line 2—2 in FIGURE 1.

The three bands 12, 14 and 16 are loosely assembled in the general form of a cube as shown in FIGURES 1 and 2. This may be done most easily by attaching the ends of each of two of the bands, say 12 and 14, together so that each of the bands 12 and 14 is in the form of a loop of the sheet material. Then the loop 12 is inserted into the loop 14 as best shown in FIGURES 1 and 2, so that the two bridges 18 of the band 14 overlie the respective two slings 20 of the band 12. Then the band 16 is interwoven between the bands 12 and 14 so that the bridges 18 of the band 16 overlie the slings 20 of the band 14, so that the bridges 18 of the band 12 overlie the slings 20 of the band 16. Then, the loose ends of the band 16 are connected together. In this manner, the entire outer or exposed surface area of the structure will be defined by the six bridges 18, which will overlie the respective six slings 20.

Because of the relatively wide, flat surface areas of the bridges and slings as arranged in FIGURES 1 and 2, it is desirable to import added structural rigidity to the particular system illustrated in FIGURES 1 to 6 by providing the arcuate scores 22 in the bridges and pinching the sides of the bridges together. This transforms the bridges 18 into very rigid truss-like members shown in FIGURES 3, 4 and 5, which are suitable for withstanding considerable compression loads. The inwardly pinched sides 24 of these truss-like structures project outwardly generally at right angles to the slings 20 as best seen in FIGURES 4 and 5, and they cause an inward deflection of the slings which adds to the tension therein. The net result is a very strong and rigid structure, even when this particular type of structure is composed of relatively thin paper.

Figure 7:
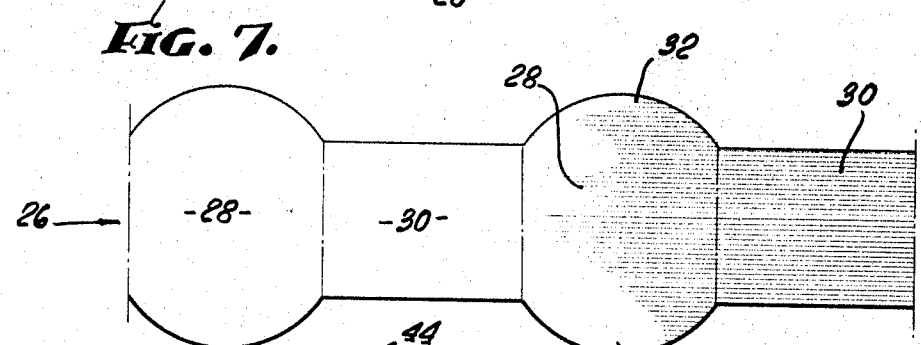
FIGURE 7 is a plan view of another form of band which can be employed in a three-band structure according to the invention.

FIGURE 7 illustrates an alternative band 26 which may be employed in a three-band, two-element (per band) structure according to the invention. In the band of FIGURE 7, each element comprises a bridge portion 28 and a sling portion 30, so that there are two of the bridges 28 and two of the slings 30. As in all bands employed for the present invention, the bridges and slings are in alternating relationship. For illustrative purposes, the bridges 28 and slings 30 are separated by phantom lines in FIGURE 7. In this case, each of the bridge portions 28 has a curved, laterally outwardly projecting ear 32, and when three of the bands like band 26 are assembled generally in the manner illustrated in FIGURES 1 and 2, in relatively tight-fitting relationship, the ears 32 will project outwardly to provide added structural strength and ornamental characteristics to the structure. Additional structural strength can be provided by bending the ears 32 outwardly generally at right angles to the planes of the respective bridge portions 28, or at other angles.

Figure 8:
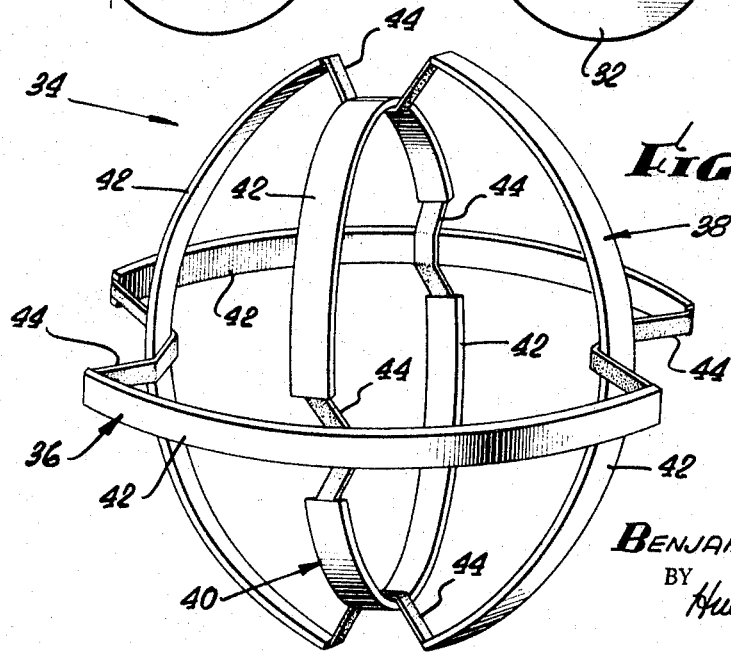
FIGURE 8 is a perspective view illustrating a further three-band structure according to the invention, the form shown in FIGURE 8 being a generally open structure which particularly well illustrates the compression-tension relationship between the bridges and slings.

FIGURE 8 also illustrates a three-band, two-element (per band) structure in accordance with the present invention. However, whereas the structure shown in FIGURES 1 to 6 has relatively wide bridges and slings which substantially completely enclose the space defined within the structure, the bands employed in FIGURE 8 are relatively thin, and are more in the nature of a framework.

The structure 34 of FIGURE 8 has three bands, generally designated 36, 38 and 40. It is notable that the plane generally defined by each of the bands 36, 38 and 40 is disposed at right angles to the planes defined by the other two bands.

Each of the bands 36, 38 and 40 comprises a pair of opposed bridges 42 which are connected together by a pair of opposed slings 44. In this case the bridges 42 are constructed of relatively long and thin rods of some generally rigid but somewhat resilient material such as wood. The slings 44 are composed of a much more flexible material, such as cloth or a flexible plastic or the like. The bridges 42 of the band 36 overlie the slings 44 of the band 40; the bridges of the band 38 overlie the slings of the band 36; and the bridges of the band 40 overlie the slings of the band 38. The relative dimensions of the bridges and slings in the structure 34 are arranged so that when the three bands 36, 38 and 40 are interengaged in the manner shown in FIGURE 8, each of the bridges 42 will be bowed. This establishes substantial tension forces in the slings 44 and compressional forces in the bridges 42, thus providing considerable support energy to the system.

While the bridges and slings of the structure shown in FIGURE 8 are illustrated as being in an overlapping relationship in much the same way as the structure shown in FIGURES 1 to 6, it is to be understood that the flexible slings 44 can be merely tied or secured to the respective bridges in this case, while maintaining the same essential tension-compression functional relationship.

While the structure of FIGURE 8 is useful for display, ornamentation and other purposes, it has also been shown and described herein because it serves to emphasize the relative planar relationship between the bands in a three-band structure according to the invention, and tensional-compressional relationship between the overlapping or interengaged bridges and slings in the system regardless of the number of bands.

Figure 9:
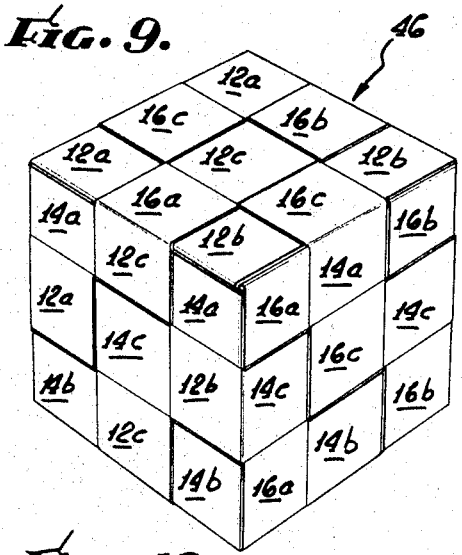
FIGURE 9 is still another three-band form of the invention, with each band comprising three separate strips of material, the strips being interwoven about the structure so as to provide additional structural strength.

FIGURE 9 is a perspective view illustrating a variant of the three-band structure, wherein each of the relatively wide bands comprises an odd number (in this case three) of ribbons of the material which are woven together so as to provide increased strength to the over-all structure. The structure 46 shown in FIGURE 9 has been arranged in perspective to correspond to the structure shown in FIGURE 1, with the three side-by-side ribbons 12a, 12b and 12c corresponding in positions to band 12 of FIGURE 1; the ribbons 14a, 14b and 14c corresponding to band 14 of FIGURE 1; and the ribbons 16a, 16b and 16c corresponding to the band 16 in FIGURE 1. In order to provide a strong integrated structure it is essential to employ an odd number of the ribbons in place of each band, and for illustrative purposes three of the ribbons have been employed to keep the structure 46 as simple as possible. The two ribbons at the sides of a particular band, as for example the ribbons 12a and 12b for the band 12, will determine whether a section of the band is a bridge or a sling on any particular facet of the structure. Thus, where the two side ribbons are exposed at the four corners of a particular facet of the structure, then the band represented by those ribbons may be considered a bridge on that facet; whereas when those side ribbons of the band are underneath other side ribbons on the corners of a particular facet, then that band may be considered a sling. For example, on the upwardly facing facet of the structure 46 in FIGURE 9, the ribbons 12a and 12b are exposed at the four corners, so that the band 12 may be considered the bridge on the upper facet. On the left-hand facet illustrated in FIGURE 9, the ribbons 14a and 14b are exposed at the corners so that band 14 is the bridge, while the ribbons 12a and 12b are internal on that facet at the corners, so that the band 12 is a sling on the left-hand facet. In like manner, the band 16 is the bridge on the right-hand facet in FIGURE 9, while the band 14 is the sling on that facet.

Normally, an interwoven structure like that shown in FIGURE 9 will only be desirable to add ornamentation and additional structural strength in the case of a device according to the invention which has only a few bands.

FIGURES 10 to 13 illustrate the construction of a dodecahedron or twelve-faceted structure 48 according to the present invention, this structure being assembled from four identical bands 50, 52, 54 and 56 which can economically be cut from a single, generally rectangular sheet of material. Each of the bands includes three identical elements, which have been separated by phantom lines, and each of the elements consists of a bridge and a sling which are of parallelogram shape and are positioned as reflected images of each other, so that each element has the general shape of a chevron, one leg of which is a bridge and the other of which is a sling. In general, when the present invention is utilized to provide a structure which is a polyhedron having discrete facets, the bridges and slings will assume parallelogram shapes. In the case of a simple three-band structure as generally illustrated in FIGURE 1, these parallelograms will flatten out to squares. With the four-band dodecahedron shown in FIGURES 10 to 13 the acute angles of the parallelograms will be considerably less than 90°, but greater than 60°. These acute angles of the parallelograms will reach approximately 60° for a regular polyhedron made in accordance with the invention where six bands having five elements each are employed, generally as illustrated in FIGURES 18 to 21 of the drawings, which will be described in detail hereinafter.

Figure 12:
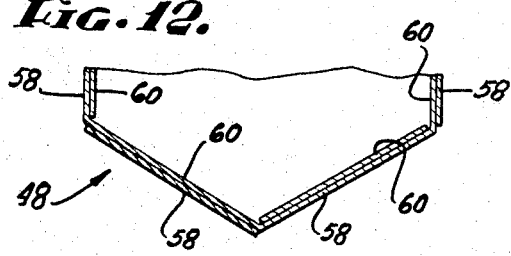
FIGURE 12 is a fragmentary horizontal section taken on the line 12—12 in FIGURE 10.

Assembly of the structure 48 from the four bands 50, 52, 54 and 56 may be accomplished in a simple manner by merely overlapping two of the bands at parallelograms which are adjacent the centers, then interweaving the other two bands adjacent their centers, and then continuing to weave the bands out to their ends, and then securing the two ends of each band together. If desired, creases can be applied between the adjacent parallelograms on each band so as to get sharp corners and flat facets as illustrated in FIGURES 10, 11 and 12.

The net result will be that the structure 48 is completely enclosed, and each facet will have an exposed bridge 58 of one of the bands, and an underlying sling 60 of one of the other bands.

Figure 10:
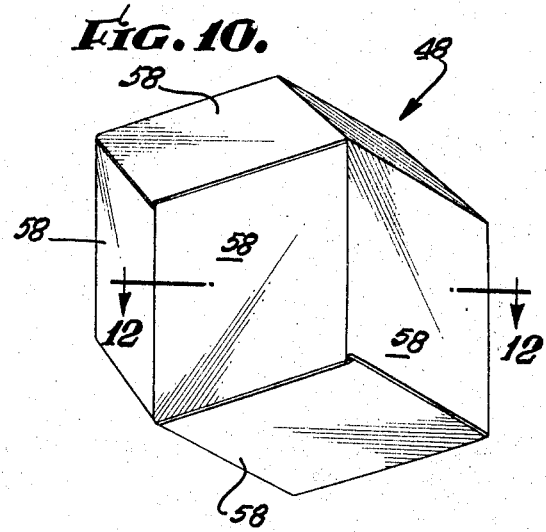
FIGURES 10 and 11 are elevational views showing opposite sides of a four-band structure according to the invention, which is in the form of a dodecahedron.
Figure 11:
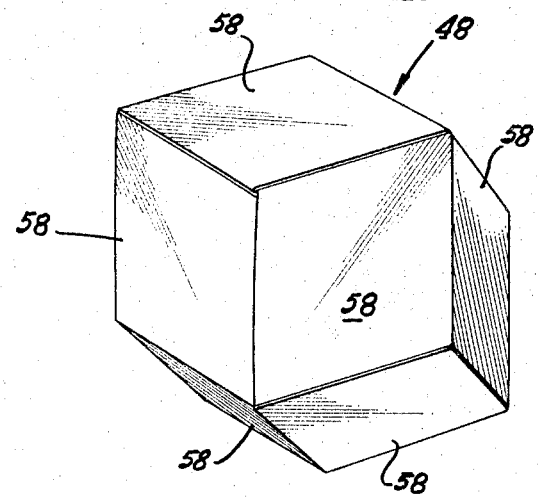

FIGURES 10 and 11 show the structure 48 from opposite sides thereof, and accordingly illustrate all twelve facets of the structure as defined by the exposed bridges 58.

Figure 14:
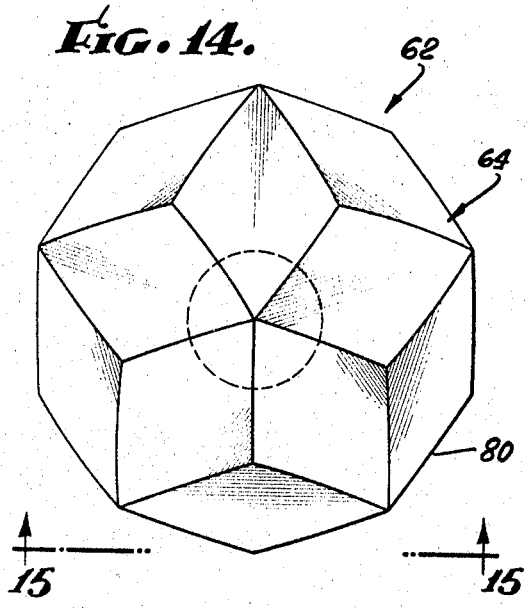
FIGURE 14 is a top plan view of a lamp having a shade constructed according to the present invention, the shade being a five-band structure with four elements per band, being an icosahedron which has been flattened from the generally spherical form.
Figure 15:
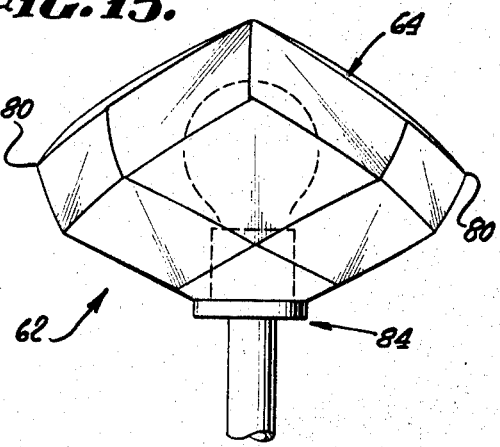
FIGURE 15 is a side elevation view taken on the line 15—15 of FIGURE 14.
Figure 16:
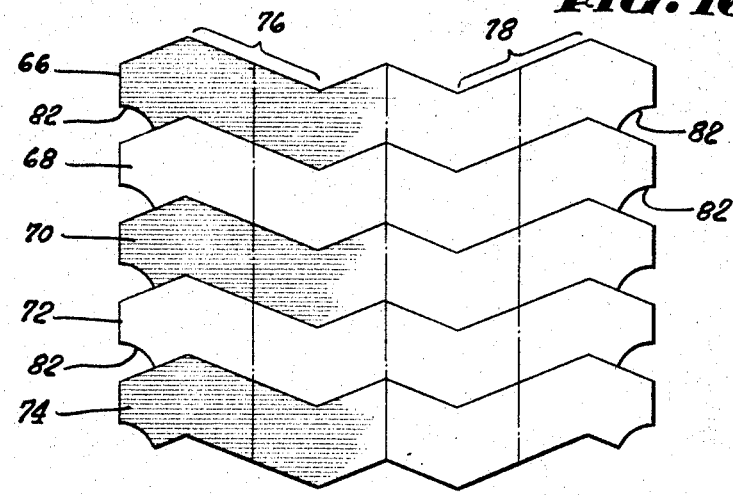
FIGURE 16 is a plan view illustrating the five bands embodied in the lamp shade shown in FIGURES 14 and 15.

FIGURES 14, 15 and 16 illustrate a lamp 62 embodying a lamp shade 64 made in accordance with the present invention.

Figure 13:
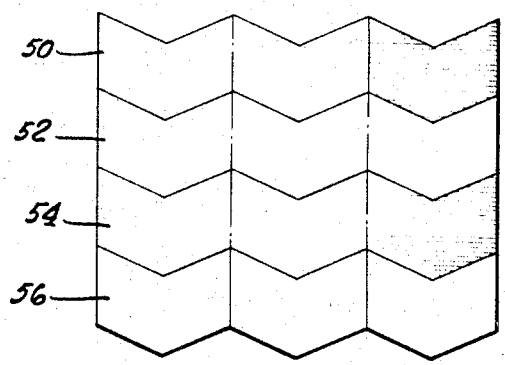
FIGURE 13 is a plan view illustrating the four bands which are interengaged to provide the structure of FIGURES 10 to 12.

Here, the shade is constructed from five identical bands 66, 68, 70, 72 and 74. Each of these bands has four elements which are set apart by phantom lines, and each element has a bridge and a sling which in this case are parallelograms having an acute angle that is approximately 60°. It will be noted that the bands shown in FIGURE 13 are constructed so that each of the three elements of each band are identical in construction, with upwardly reflecting parallelograms. In contrast, the bands shown in FIG. 16 have two downwardly reflecting pairs of bridge-sling parallelograms, and two upwardly reflecting pairs of bridge-sling parallelograms. Thus, instead of a regular zig-zag pattern between the adjacent bridges and slings, as in the bands of FIGURE 13, the bands of FIGURE 16 each include two bridge-sling pairs which are extensions of double-length parallelograms, which are identified by the reference numerals 76 and 78 in FIGURE 16. This difference in construction results in an icosahedron which has been squashed or flattened vertically from the generally spherical form which is produced by a regular zig-zag pattern for the alternating bridges and slings of each band. This is most apparent from side elevation view in FIGURE 15. The five bands 66, 68, 70, 72 and 74 of FIGURE 16 are interwoven in much the same manner as the four bands of FIGURE 13, starting adjacent the centers of the bands, which is at the top of the lamp shade as shown in plan view in FIGURE 14 and in elevation in FIGURE 15. The double-length parallelograms 76 and 78 for each band are bent back upon themselves along the phantom lines which bisect them in FIGURE 16, which produces the relatively sharp edged portion 80 as shown in FIGURES 14 and 15.

It will be noted that small arcuate corner segments have been removed from the acute angles of the parallelograms at the ends of the bands, as indicated at 82. When the bands are completely assembled to provide the lamp shade 64 as illustrated in FIGURES 14 and 15, this leaves a generally circular opening at the base of the shade to accommodate a light fixture, as shown in dotted lines in FIGURE 15. The ends of the bands can be cemented or stapled together to provide a permanent, generally rigid structure. The lamp 62 may include any suitable base portion 84 upon which the lamp shade 64 may rest. It will be apparent that lamp shades of this general character can be provided in a wide variety of configurations with the present invention, and may either be supported from the bottom or suspended from the top, or otherwise supported.

Figure 17:
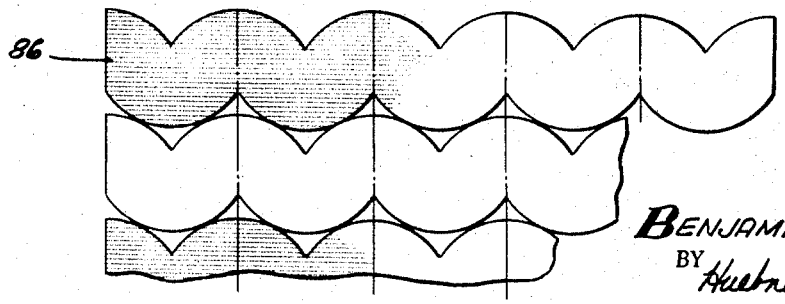
FIGURE 17 illustrates one complete band and portions of several others, these bands having five elements which are curved so that the facets of the structure fabricated therefrom will curve to closely conform to a spherical shape.

FIGURE 17 illustrates one complete band 86 and fragments of several others which have five elements wherein the bridges and slings are in a regular zig-zag pattern. However, it is to be noted that instead of regular parallelograms for the bridges and slings, the sides of the parallelograms have been curved. When six of these identical bands 86 are interwoven to provide a space-containing structure according to the invention, this curvature tends to transform the individual facets of the structure into outwardly bowing facets which are close in shape to the over-all spherical configuration of the structure. In this manner, the entire structure will be close to a true sphere, instead of a faceted or segmented sphere.

FIGURES 18 to 21 illustrate another lamp 88 having a lamp shade 90 that is constructed from six bands 92, 94, 96, 98, 100 and 102 which are substantially identical to each other in shape, and which have a regular zig-zag pattern of alternating bridge-sling parallelograms like the four-band pattern of FIGURE 13. However, in the case of six bands, the acute angles of the parallelograms will be approximately 60°.

To assemble the lamp shade 90, five of the bands, 92, 94, 96, 98 and 100, are interwoven starting adjacent their centers, and the sixth band, 102, is connected at its ends to form a loop. When the five bands are approximately half interwoven, the sixth band 102 is inserted as an equator, and then the remaining five bands are further interwoven to complete the structure. Thus, in the completed lamp shade 90, band 102 will be disposed generally horizontally and centrally positioned, in the region of the section line 21—21, so that it is seen as a continuous strip in FIGURE 21.

Corner segments are removed at 104 in the five bands 92, 94, 96, 98 and 100, to provide an opening in the completed structure for insertion of the lamp fixture. No such cutout segment is removed from the band 102, because of its equatorial position spaced from the opening. The ends of the five bands 92, 94, 96, 98 and 100 are attached together adjacent the opening at the bottom of the lamp shade 90 by any suitable means, as by means of an adhesive or clips, and the shade is installed on a suitable base 106.

Figure 18:
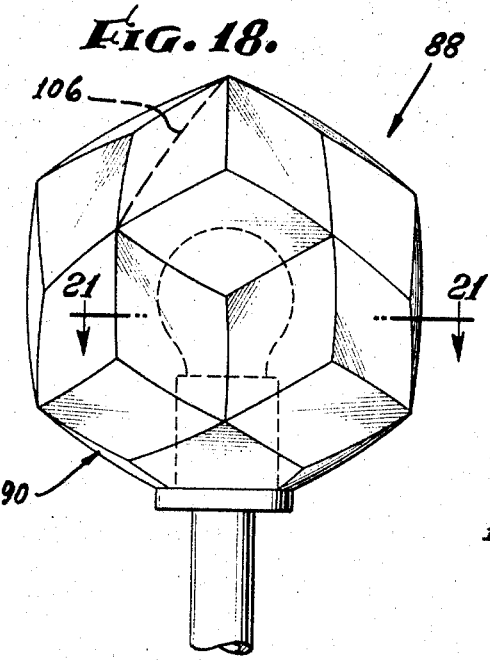
FIGURE 18 is a side elevation view illustrating a lamp having a shade composed of six bands according to the present invention.
Figure 19:
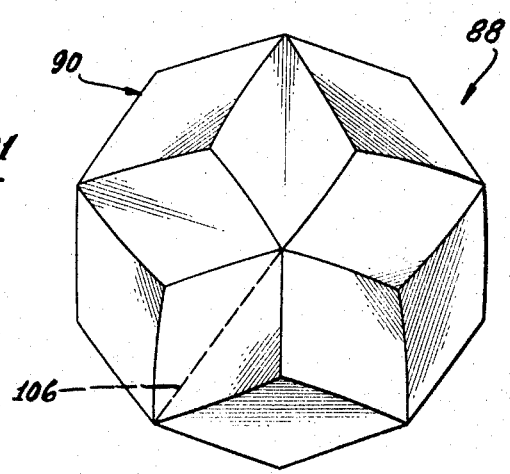
FIGURE 19 is a top plan view of the lamp shown in FIGURE 18.
Figure 20:
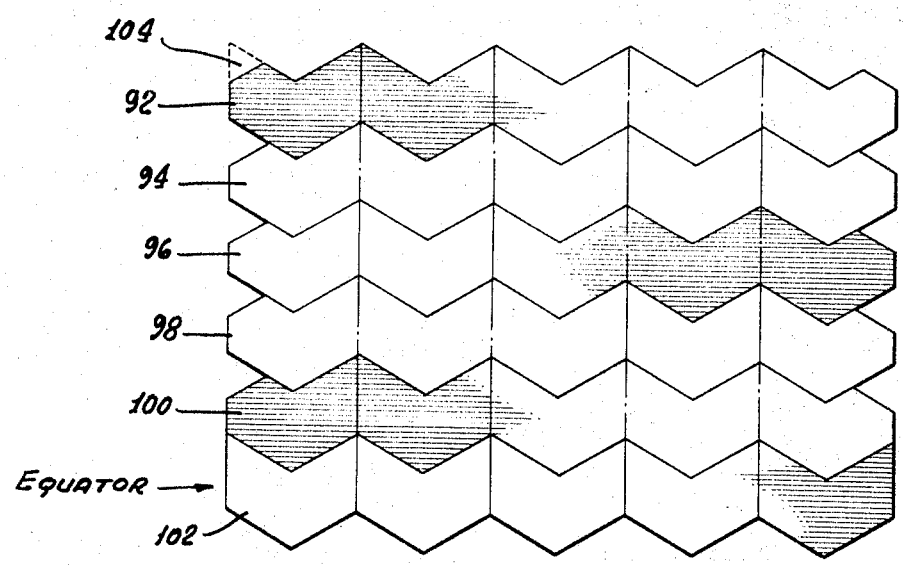
FIGURE 20 is a plan view showing the six bands employed in the lamp of FIGURES 18 and 19 laid out in flat form.
Figure 21:
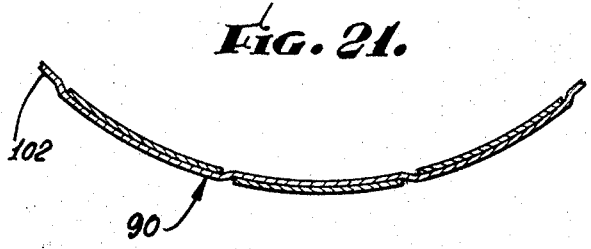
FIGURE 21 is a fragmentary horizontal section taken on the line 21—21 in FIGURE 18.

It is notable that the lamp shade 90 shown in FIGURES 18 and 19, is, generally, a regular thirty-faceted polyhedron.

The lamp shades shown in FIGURES 14, 15, 18 and 19, are merely two examples of a wide variety of practical devices which can be constructed from relatively thin sheet material to form strong and beautiful structures according to the present invention. The bands employed for each of these devices are substantially identical and can be readily mass-produced with practically no waste. Such mass production can be accomplished by simple die-stamping and assembly procedures to provide very durable and artistic structures at a surprisingly low cost. The true geodesic nature of the system provides not only good strength but a very unique artistic characteristic of ornamentation which will carry through a wide variety of different structures. While the present invention is in on way limited to the use of any particular materials, it has been found that satisfactory lamp shades can be constructed from various thicknesses and textures of paper, and from thin plastic sheeting, as for example rigid vinyl about five mils in thickness.

Since each facet has a double wall, variations in ornamentation can be provided by cutting out sections of either the inner or the outer walls, or by applying printing to either the inner or the outer wall, or by providing curving sections instead of straight sections. The application of different scorings and bendings or creasings will provide differences in appearance. For example, part or all of the facets of the lamp shade 90 shown in FIGURES 18 and 19 may be diagonally scored as shown by the dotted line 106 in FIGURES 18 and 19, and an outwardly directed crease applied at such position. This provides a different ornamental appearance, as well as additional strength to the structure.

Other means for providing differences in appearance are to vary the colors of the bands or sections of the bands, so as to provide various color combinations for the inner and outer walls at different points in the structures. Vacu-forming can provide interesting variations in the shapes of the bridges or slings, or both, to apply varying ornamentation and structural characteristics.

In all of the structures made according to the present invention there is a surprisingly good structural strength-to-weight ratio, with the structure being entirely self-supporting without any need for additional structural members.

While certain embodiments of this invention have been specifically disclosed herein, it is to be understood that this invention is not to be limited thereto as many variations will be readily apparent to those skilled in this art and this invention is to be given its broadest possible interpretation consistent with the prior art.

I claim:

1. A self-supporting geodesic structure which comprises at least three elongated geodesic bands of substantially the same configuration, each of said bands comprising a series of connected structural elements one less in number than said bands, said elements each comprising a bridge portion and a sling portion, with said bridge and sling portions alternating along the length of each band, said bands being interengaged to define a space container, with each bridge member of each band overlying a respective sling member of another band.

2. A structure as defined in claim 1, wherein said bands are closely interfitted to place the bridges under compression and the slings in tension, thereby providing support energy for the self-supporting structure.

3. A structure as defined in claim 1, wherein at least one of said bridges is provided with opposed, curved scores which extend inwardly from opposite sides of the bridges, the sides of said scored bridge being pinched toward each other so that the bridge is bent along said scores and rendered substantially rigid.

4. A structure as defined in claim 1, wherein each of said geodesic bands has a generally zig-zag configuration along its length.

5. A structure as defined in claim 4, wherein each of said elements has a generally chevron-shaped configuration, with the chevrons connected end-to-end in series, the two legs of each chevron being generally parallelogram-shaped and constituting the bridge and sling portions of the element.

6. A structure as defined in claim 4, wherein each of said geodesic bands constitutes a series of generally parallelogram-shaped portions arranged end-to-end and constituting alternating bridge and sling portions of the band.

7. A structure as defined in claim 6, wherein the sides of said generally parallelogram-shaped portions are convexly curved.

8. A structure as defined in claim 6, wherein the sides of said generally parallelogram-shaped portions are generally straight.

9. A structure as defined in claim 6, wherein the generally zig-zag configuration of each band includes a change in direction between each of the adjacent bridges and slings along the length of the band, the general overall configuration of the structure being spherical.

10. A structure as defined in claim 6, wherein the generally zig-zag configuration of each band includes a change in direction between a plurality of bridge-sling pairs, with a continuity of direction between at least two bridge-sling pairs, the general over-all configuration of the structure being a flattened sphere.

References Cited

UNITED STATES PATENTS

| | | | |
|---|---|---|---|
| 3,093,461 | 6/1963 | Woolven | 161—17 |
| 3,199,871 | 8/1965 | Dorn | 156—228 X |
| 3,392,495 | 7/1968 | Attern et al. | 52—81 |

OTHER REFERENCES

William D. Murray and Francis J. Rigney, "Fun With Paper Folding," 1928, pp. 72, 73, 74, 79, 85.

EARL M. BERGERT, *Primary Examiner.*

J. C. GIL, *Assistant Examiner.*

U.S. Cl. X.R.

D48—16; 240—10, 108